(12) United States Patent
Perdue et al.

(10) Patent No.: US 11,053,081 B2
(45) Date of Patent: Jul. 6, 2021

(54) DIRECT DRIVE SPIRAL CONVEYOR BELT SYSTEMS AND METHODS

(71) Applicant: Cambridge International, Inc., Cambridge, MD (US)

(72) Inventors: Thomas O. Perdue, Salisbury, MD (US); Frank Salsone, Glen Head, NY (US)

(73) Assignee: Cambridge International, Inc., Cambridge, MD (US)

( * ) Notice: Subject to any disclaimer, the term of this patent is extended or adjusted under 35 U.S.C. 154(b) by 0 days.

(21) Appl. No.: 16/868,678

(22) Filed: May 7, 2020

(65) Prior Publication Data

US 2020/0354152 A1 Nov. 12, 2020

Related U.S. Application Data

(60) Provisional application No. 62/844,940, filed on May 8, 2019.

(51) Int. Cl.
*B65G 21/18* (2006.01)
*B65G 23/06* (2006.01)

(52) U.S. Cl.
CPC ............ *B65G 21/18* (2013.01); *B65G 23/06* (2013.01); *B65G 2207/24* (2013.01); *B65G 2811/09* (2013.01)

(58) Field of Classification Search
CPC .... B65G 21/18; B65G 23/06; B65G 2207/24; B65G 2811/09
See application file for complete search history.

(56) References Cited

U.S. PATENT DOCUMENTS

| | | | |
|---|---|---|---|
| 3,348,659 A | * | 10/1967 | Roinestad ............. F25D 13/067 198/778 |
| 4,078,655 A | | 3/1978 | Roinestad |
| 4,450,953 A | | 5/1984 | Le Cann et al. |
| 4,741,430 A | | 5/1988 | Roinestad |

(Continued)

FOREIGN PATENT DOCUMENTS

WO 9702198 A1 1/1997

OTHER PUBLICATIONS

PCT International Search Report and Written Opinion, PCT/US2020/031761, dated Jul. 27, 2020, 8 pages.

(Continued)

*Primary Examiner* — Gene O Crawford
*Assistant Examiner* — Keith R Campbell
(74) *Attorney, Agent, or Firm* — Quarles & Brady LLP

(57) ABSTRACT

A direct drive spiral conveyor belt system that includes a drum configured to rotate about a drum axis and define a drive member, a belt configured to engage the drum and define a belt drive feature, and an engagement control ramp configured to rotate with the drum and selectively engage the belt. The engagement control ramp includes a first portion defining a first radial distance from the drum axis and a second portion defining a second radial distance from the drum axis, with the first radial distance being greater than the second radial distance. The second portion of the engagement control ramp is configured to selectively engage the belt and allow the belt drive feature to transition into engagement with the drive member as the drum rotates about the drum axis and the belt moves along the drum.

21 Claims, 13 Drawing Sheets

(56) References Cited

U.S. PATENT DOCUMENTS

| | | | |
|---|---|---|---|
| 4,852,720 A | 8/1989 | Roinestad | |
| 4,858,750 A | 8/1989 | Cawley | |
| 4,941,566 A | 7/1990 | Irwin | |
| 5,133,449 A | 7/1992 | Spangler | |
| 5,139,135 A | 8/1992 | Irwin et al. | |
| 5,141,099 A | 8/1992 | Baumgartner | |
| 5,310,045 A | 5/1994 | Palmaer et al. | |
| 5,318,169 A | 6/1994 | Faulkner et al. | |
| 5,346,059 A | 9/1994 | Irwin | |
| 5,358,096 A | 10/1994 | Faulkner et al. | |
| 5,431,275 A | 7/1995 | Faulkner | |
| 5,460,260 A | 10/1995 | Ochs et al. | |
| 5,566,817 A | 10/1996 | Meeker | |
| 5,775,480 A | 7/1998 | Lapeyre et al. | |
| 5,954,187 A | 9/1999 | Hager | |
| 6,129,205 A | 10/2000 | Ergenbright et al. | |
| 6,484,379 B2 | 11/2002 | Palmaer | |
| 6,564,930 B1 | 5/2003 | Colding-Kristensen et al. | |
| 6,578,704 B1 | 6/2003 | MacLachlan | |
| 6,796,418 B1 | 9/2004 | Harrison et al. | |
| 6,837,367 B1 | 1/2005 | Klein et al. | |
| 7,070,043 B1 | 7/2006 | MacLachlan et al. | |
| 7,410,047 B2 | 8/2008 | van Faassen | |
| 7,735,637 B2 | 6/2010 | Montgomery et al. | |
| 7,762,388 B2 | 7/2010 | Lago | |
| 7,971,707 B2 | 7/2011 | Elsner | |
| 7,987,974 B2 | 8/2011 | Montgomery et al. | |
| 8,047,356 B2 | 11/2011 | Elsner | |
| 8,181,771 B2 | 5/2012 | Talsma | |
| 8,302,764 B2 | 11/2012 | Johnson | |
| 8,522,960 B2 | 9/2013 | Johnson | |
| 8,678,178 B2 | 3/2014 | Bickel, Jr. et al. | |
| 8,752,698 B2 | 6/2014 | Lasecki et al. | |
| 8,844,713 B2 | 9/2014 | Lasecki | |
| 8,857,607 B2 | 10/2014 | Lasecki et al. | |
| 8,857,608 B2 | 10/2014 | Lackner et al. | |
| 8,899,409 B2 | 12/2014 | Lasecki | |
| 8,985,318 B2 | 3/2015 | Neely | |
| 9,061,829 B2 | 6/2015 | Salsone et al. | |
| 9,079,719 B2 | 7/2015 | Talsma et al. | |
| 9,096,380 B2 | 8/2015 | Lasecki et al. | |
| 9,150,359 B2 | 10/2015 | Lasecki et al. | |
| 9,377,151 B2 | 6/2016 | Jensen | |
| 9,394,109 B2 | 7/2016 | Talsma et al. | |
| 9,481,523 B2 | 11/2016 | Talsma et al. | |
| 9,527,673 B2 | 12/2016 | Bogle et al. | |
| 9,708,126 B2 | 7/2017 | Bogle | |
| 9,815,630 B1 | 11/2017 | Coto | |
| 9,884,723 B2 | 2/2018 | Neely et al. | |
| 10,023,388 B2 | 7/2018 | Talsma et al. | |
| 10,189,645 B2 | 1/2019 | Talsma et al. | |
| 10,280,004 B2 | 5/2019 | Perdue et al. | |
| 10,364,101 B2 | 7/2019 | Neely et al. | |
| 10,501,265 B2 | 12/2019 | Talsma et al. | |
| 10,730,701 B1 * | 8/2020 | Westcott | B65G 17/086 |
| 2006/0249359 A1 | 11/2006 | Pasch | |
| 2008/0023304 A1 | 1/2008 | Elsner | |
| 2011/0056806 A1 | 3/2011 | Johnson | |
| 2012/0006654 A1 | 1/2012 | Talsma | |
| 2015/0353285 A1 | 12/2015 | Matsuzaki et al. | |
| 2017/0022012 A1 * | 1/2017 | Neely | B65G 17/086 |
| 2019/0016535 A1 * | 1/2019 | Elsner | B65G 17/385 |

OTHER PUBLICATIONS

Ashworth Bros., Inc., PosiDrive Spiral (TM), Food Engineering Magazine, Oct. 2017, 1 page.

* cited by examiner

DIRECT DRIVE SPIRAL CONVEYOR BELT SYSTEMS AND METHODS

CROSS-REFERENCE TO RELATED APPLICATION

This application claims priority under 35 U.S.C. § 119 to U.S. Provisional Patent Application No. 62/844,940 filed on May 8, 2019, the entire contents of which are incorporated herein by reference.

STATEMENT CONCERNING FEDERALLY SPONSORED RESEARCH AND DEVELOPMENT

Not applicable.

TECHNICAL FIELD

The present disclosure is described in the context of spiral conveyor belt systems and methods. More specifically, the present disclosure relates to direct drive spiral conveyor belts configured to transition between a linear portion and a direct drive spiral portion.

BACKGROUND

Spiral conveyor belt systems are designed to provide a large amount of belt carry surface within a relatively small footprint, such as on a manufacturing plant floor. This makes spiral conveyor belt systems well-suited for applications such as freezing, cooling, proofing, cooking, etc. Many spiral conveyor belt systems incorporate a "low-tension" frictional drive that utilizes a rotating drum composed of multiple vertical uprights. The vertical uprights of the rotating drum drive the belt forward by imparting a friction and traction force against the inside belt edge as the drum rotates, thereby driving the belt forward and along the vertical helix of the spiral conveyor belt system. Such systems, however, also impart a high tension throughout the belt, which can contribute to a reduced service life of the belt.

Other spiral conveyor belt systems incorporate a direct drive. A direct drive arrangement utilizes a positive engagement between a belt drive feature, often positioned near the inside belt edge (e.g., formed ends of an exposed connector rod/pin of the belt), and drive members of the drum that are often positioned along the vertical uprights (e.g., vertical ribs included on caps that attach to select vertical uprights). Although this type of system generally lowers overall belt tension once the belt is fully engaged, the initial engagement between the belt and the drive members can be challenging to achieve in consistent, efficient, and structurally sound manners. For instance, controlling and/or accounting for the interaction between the variable pitch of a conveyor belt (e.g., the dynamic distance between belt drive features) as it begins to collapse and fully engage with the spaced drive members (e.g., vertical ribs) of the rotating drum presents unique challenges, including aspects of maintaining desired tension in the belt as it engages, rides along, and disengages the drive members. In addition, variations in belt properties and dimensions (e.g., such as a result of wear and environmental influence) introduce additional considerations to address, particularly to the initial engagement between the belt and the drive members in either an up-go spiral or a down-go spiral.

Therefore, a need exists for improved spiral conveyor belt systems and methods that maintain and enhance the conventional features and benefits, while addressing various deficiencies associated with the interaction between the belt and the drive members during transition between linear and spiral portions of a direct drive spiral conveyor belt system.

SUMMARY

Some embodiments provide a direct drive spiral conveyor belt system that includes a drum configured to rotate about a drum axis and define a drive member, a belt configured to engage the drum and define a belt drive feature, and an engagement control ramp configured to rotate with the drum and selectively engage the belt. The engagement control ramp includes a first portion defining a first radial distance from the drum axis and a second portion defining a second radial distance from the drum axis, with the first radial distance being greater than the second radial distance. The second portion of the engagement control ramp is configured to selectively engage the belt and allow the belt drive feature to transition into engagement with the drive member as the drum rotates about the drum axis and the belt moves along the drum.

Other embodiments provide a direct drive spiral conveyor belt system that includes a drum configured to rotate about a drum axis and define a filler bar and a cage bar, the cage bar defining a drive member having a drive member length parallel to the drum axis, a belt configured to engage the drum and define a belt drive feature adapted to operatively engage the drive member, and an engagement control ramp having an engagement control ramp length parallel to the drum axis that is less than the drive member length and configured to rotate with the filler bar and operatively engage the belt. The engagement control ramp comprises a first portion defining a first radial distance from the drum axis and a second portion defining a second radial distance profile that decreases radially from the first radial distance. The engagement control ramp is configured to define a dynamic axial and radial engagement between the drive member and the belt drive feature as the belt drive feature transitions into engagement with the drive member while the drum rotates about the drum axis and the belt moves relative to the engagement control ramp.

Further embodiments provide a method of operating a direct drive spiral conveyor system having a conveyor belt with a plurality of belt drive features, and a drum rotatable about a drum axis and comprising a cage bar having a drive member that extends a drive member length and a filler bar, separate from the cage bar, having an engagement control ramp that extends an engagement control ramp length that is less than the drive member length and defines a ramp portion that transitions between a secondary diameter and a primary diameter that is less than the secondary diameter. The method comprising engaging a first belt drive feature of the plurality of belt drive features of the conveyor belt with the engagement control ramp of the filler bar proximate the secondary diameter, and engaging a second belt drive feature of the plurality of belt drive features of the conveyor belt with the drive member of the cage bar as the first belt drive feature is dynamically engaged with the engagement control ramp within the ramp portion that transitions between the secondary diameter and the primary diameter.

Still further embodiments provide an engagement control ramp configured for use with a drum of a direct drive spiral conveyor system, the drum comprising at least one filler bar and at least one cage bar that is separate from the filler bar and that defines a drive member having a drive member length. The engagement control ramp comprises a body extending along a length from a first end to a second end, wherein the body is configured to move with the filler bar of the drum and the length is less than the drive member length, a planar portion located near the first end, and a ramp portion adjacent to the planar portion, the ramp portion being increasingly spaced from the planar portion in two orthogonal directions to define a radial distance profile along a portion of the length.

BRIEF DESCRIPTION OF THE DRAWINGS

The following detailed description is to be read with reference to the figures, in which like elements in different figures have like reference numerals. The figures, which are not necessarily to scale, depict selected embodiments and are not intended to limit the scope of embodiments of the invention. Given the benefit of this disclosure, skilled artisans will recognize the examples provided herein have many useful alternatives that fall within the scope of the invention.

DETAILED DESCRIPTION

Figure 1:
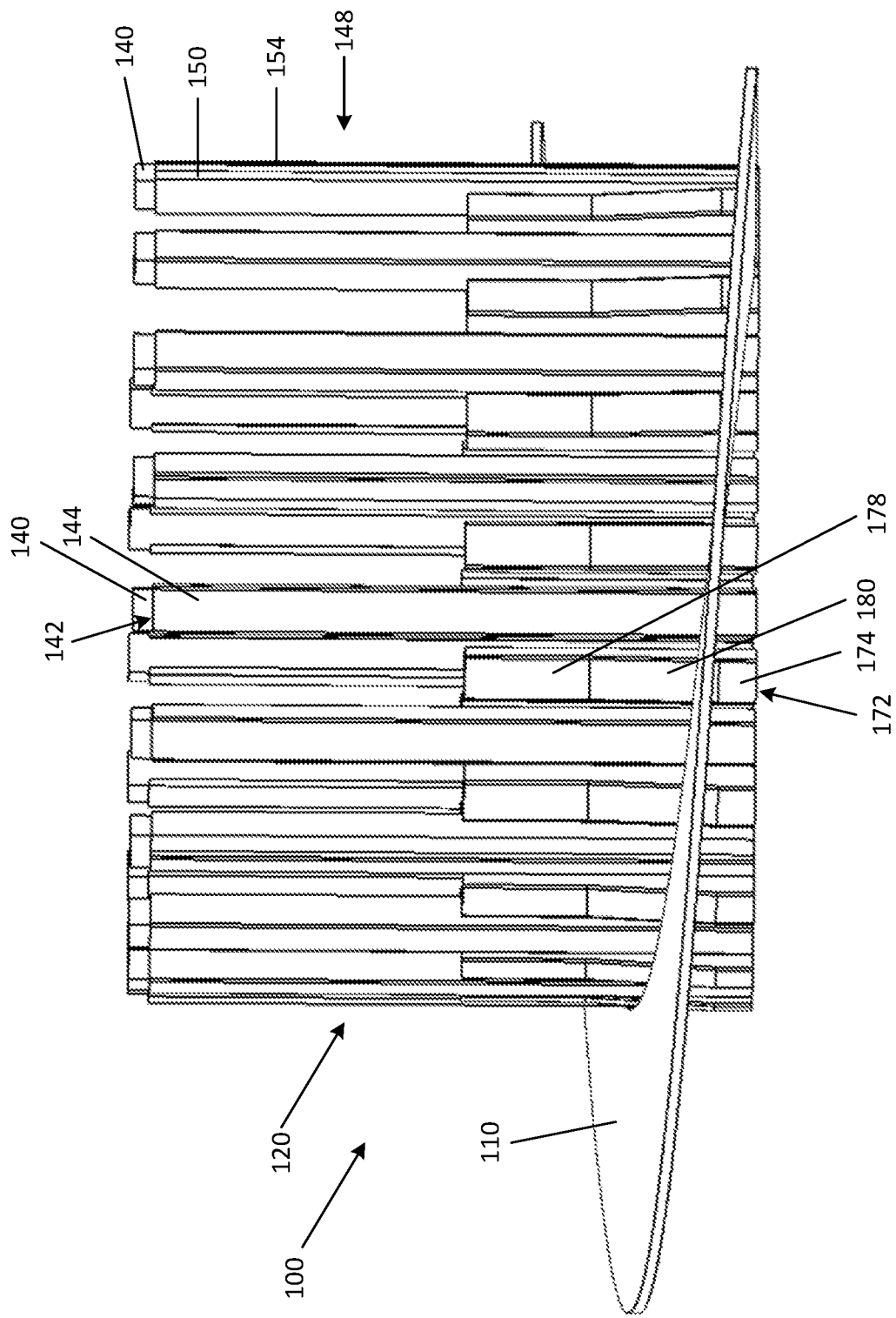
FIG. 1 is a simplified side elevation view of an example direct drive spiral conveyor belt system in accordance with one embodiment.
Figure 2:
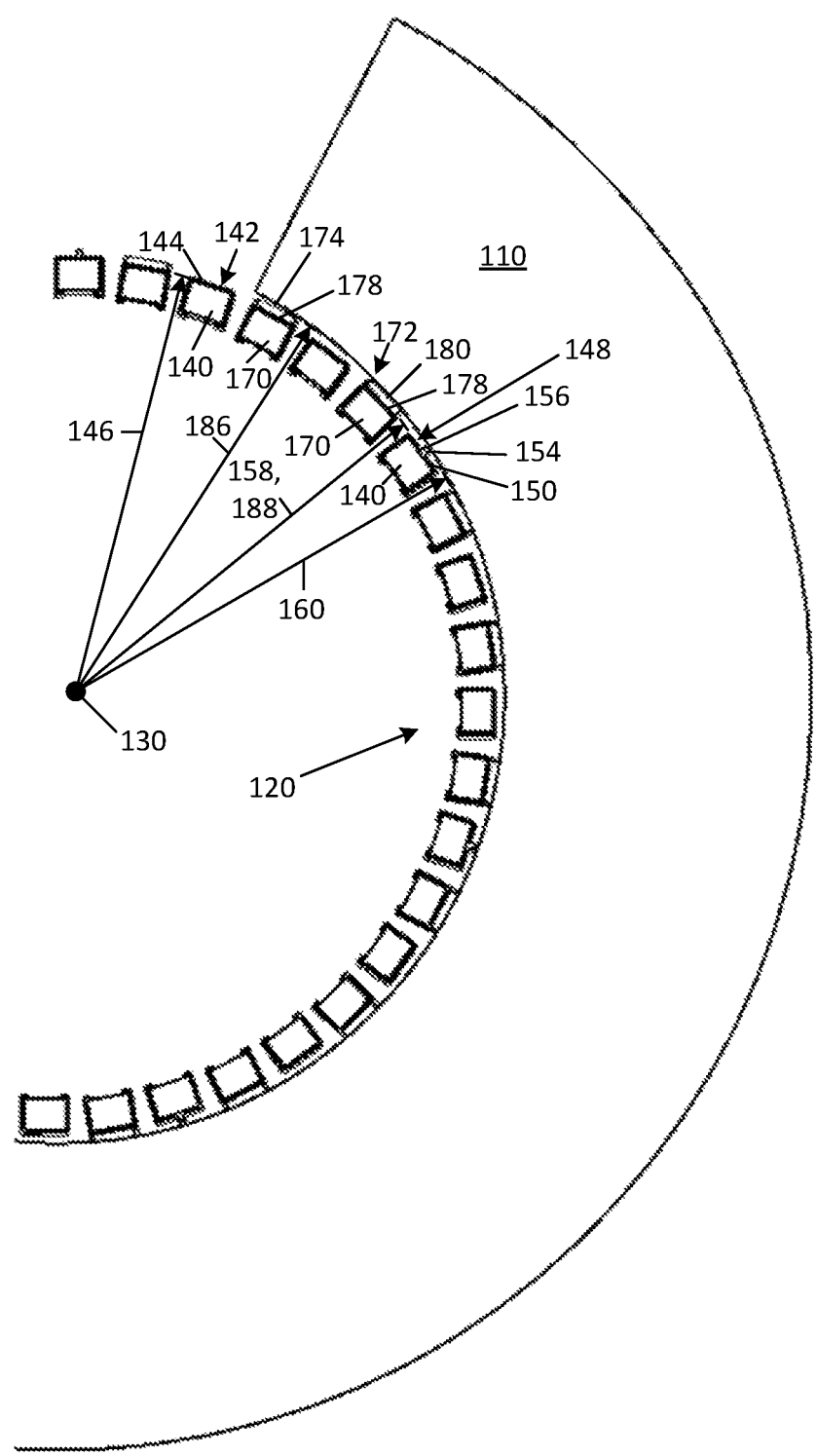
FIG. 2 is a top plan view of a portion of the direct drive spiral conveyor belt system shown in FIG. 1.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled," and variations thereof, are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Given the benefit of this disclosure, various modifications to the illustrated embodiments will be readily apparent to those skilled in the art and the underlying principles herein can be applied to other embodiments and applications without departing from embodiments of the invention. Thus, embodiments of the invention are not intended to be limited to embodiments shown, but are to be accorded the widest scope consistent with the principles and features disclosed herein.

Some of the discussion below describes direct drive spiral conveyor belt systems that can be incorporated into new and/or retrofit into existing direct drive spiral conveyor belt system arrangements. The context and particulars of this discussion are presented as examples only. For instance, embodiments of the disclosed invention can be configured in various ways, including other shapes and arrangements of elements including the example engagement control ramps and filler bars. Similarly, embodiments of the invention can be used with other types of conveyor belts or assemblies (e.g., metal mesh, modular plastic, etc.) in addition to those expressly illustrated or described herein and, for instance, may be incorporated into an up-go and/or a down-go conveyor system.

A conveyor belt is typically an endless belt driven in a direction of travel. In instances where a large amount of belt carry surface within a relatively small footprint is desired, for instance on a manufacturing plant floor supporting applications such as freezing, cooling, proofing, cooking, etc., spiral conveyor belt systems are well-suited. In a conveyor belt arrangement incorporating a direct drive spiral conveyor belt system, the conveyor belt includes a generally linear segment that merges (e.g., somewhat tangentially) along a transitional zone with a generally helical spiral segment to achieve positive engagement between a belt drive feature often located near the inside edge of the belt and a cooperating drive member rotating with the drum.

A simplified depiction of a portion of an example direct drive spiral conveyor belt system 100 is shown and described with reference to FIGS. 1-4. In addition to having a belt 110, the example direct drive spiral conveyor belt system 100 has a plurality of vertical cage bars 140 and a plurality of filler bars 170 that generally form a drum 120, which rotates about a drum axis 130. The rotation of the drum 120 can be implemented via conventional means, such as one or more electric motors, power transmissions, and controllers. The plurality of filler bars 170 may be alternately spaced with the plurality of vertical cage bars 140. In other examples, the ratio and pattern of cage bars 140 and filler bars 170 can be adapted to address application-specific requirements (e.g., based on dimensions of the drum 120, load capacity specifications, throughput and velocity specifications, etc.). Furthermore, while the filler bars 170 are illustrated as having a generally square cross-section and extending only a portion of the distance between top and bottom ends of the drum 120, the filler bars 170 may have a variety of form factors. In addition, the filler bars 170 can be configured to extend a sufficient axial/vertical distance to span and accommodate the transition of the belt 110 into positive engagement with the drive member of the drum 120. The nominal dimensions for a particular application generally correspond to the sizing of the various components of the overall direct drive spiral conveyor belt system 100 within which the filler bars 170 are incorporated. The filler bars 170 (and the alternatives) may be retrofit into existing systems or integral with a new system.

As shown, a first number of the plurality of vertical cage bars 140 may have a cage bar blank cap 142 attached thereto (e.g., clipped, adhered, bolted, etc.). The cage bar blank cap 142 generally defines a planar portion 144 facing generally radially outward when the cage bar blank cap 142 is coupled to a respective vertical cage bar 140. When attached to one of the plurality of vertical cage bars 140, the cage bar blank cap 142 defines a first radial distance 146 between the planar portion 144 and the drum axis 130.

A second number of the plurality of vertical cage bars 140 may have a cage bar drive cap 148 (shown best in FIG. 4) with a planar portion 150 along a length 152 of the cage bar drive cap 148. The example cage bar drive cap 148 defines a drive member in the form of a rib 154. The example rib 154 extends away from the planar portion 150 and tapers toward a rib surface 156, the rib 154 also may extend along the entire length 152 of the cage bar drive cap 148. In other forms, the drive member may comprise various other form factors configured to mate with and establish positive engagement with a cooperating belt drive feature formed, for example, on at least a portion of the inner edge of the belt 110.

Similar to the plurality of cage bar blank caps 142, when a cage bar drive cap 148 is attached to one of the plurality of the vertical cage bars 140, a second radial distance 158 is defined between the planar portion 150 and the drum axis 130. The second radial distance 158 is substantially similar to the first radial distance 146. The term "substantially" used throughout encompasses dimensions that are within at least 10%, preferably less than 5%, and more preferably less than 1%. A third radial distance 160 is also established and defined between the rib surface 156 and the drum axis 130. The various distances can be application specific and generally related to the overall dimensions of the particular direct drive spiral conveyor belt system 100.

Figure 3:
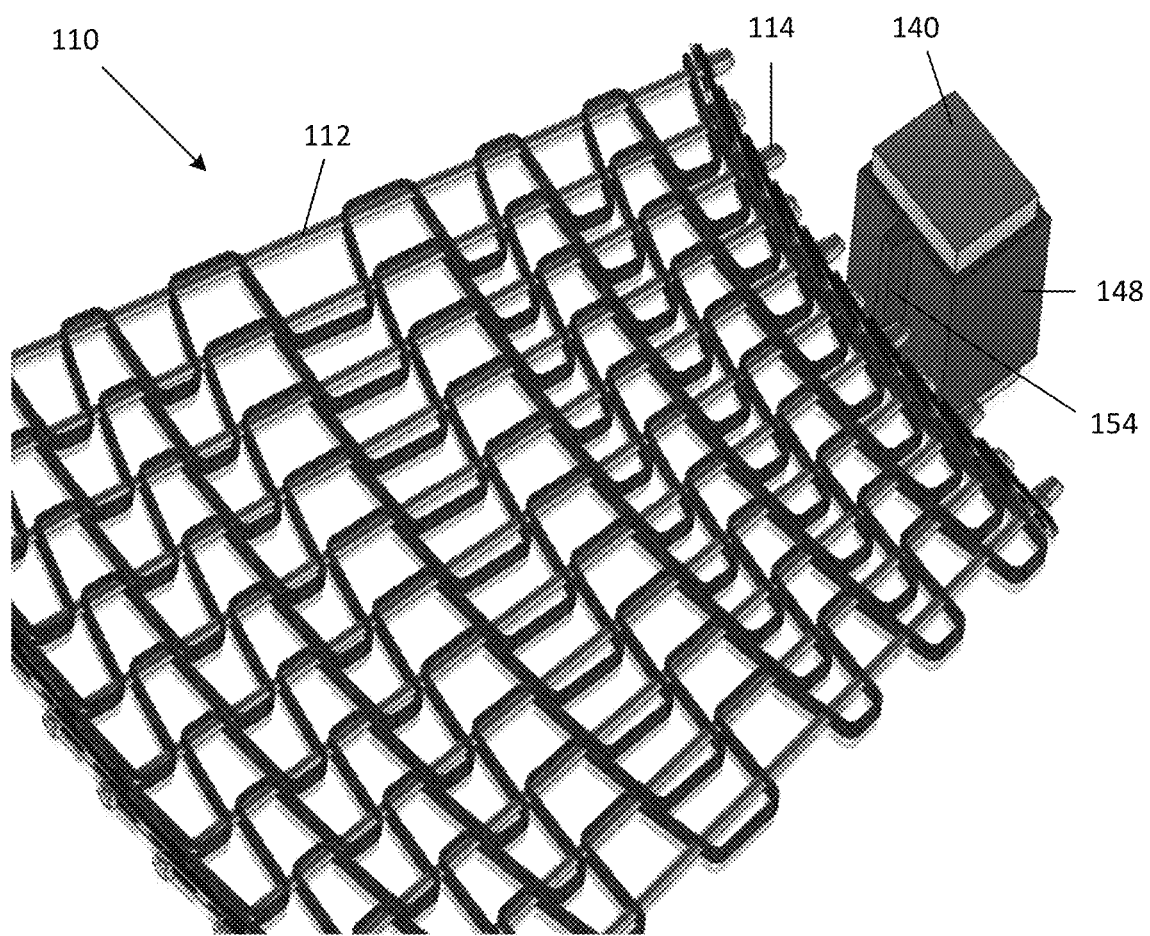
FIG. 3 is a more detailed isometric view of a section of another example of a direct drive spiral conveyor belt system.
Figure 4:
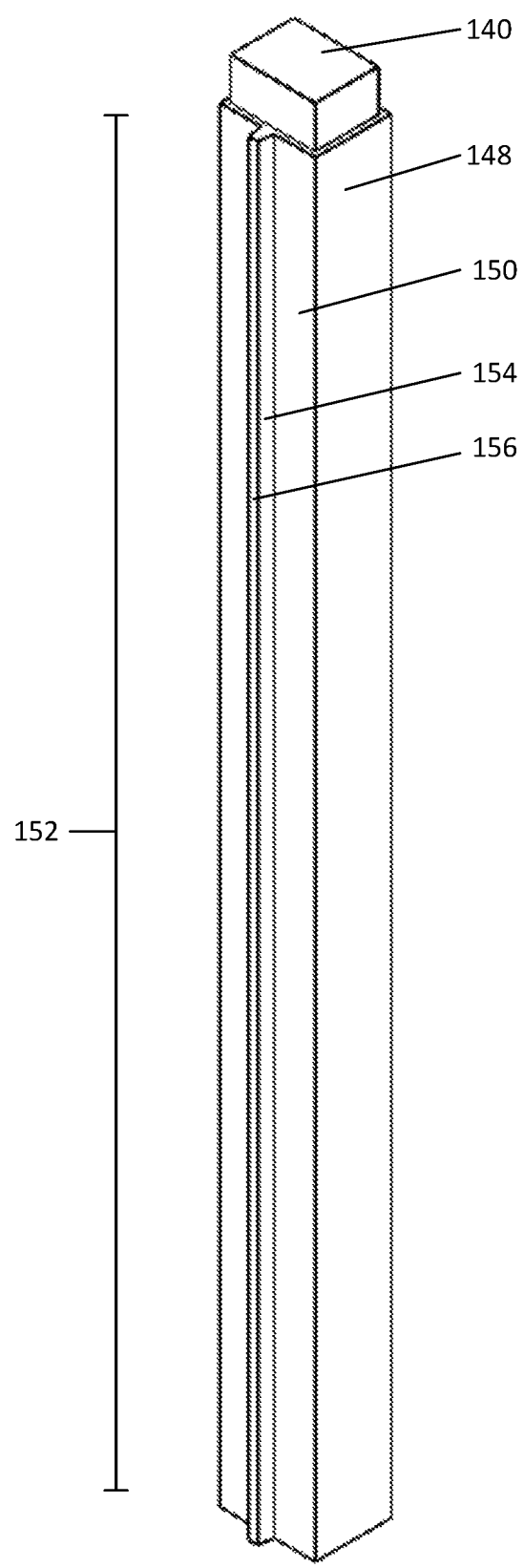
FIG. 4 is an isometric view of a cage bar with an example cage bar drive cap in accordance with one embodiment.
Figure 5A:
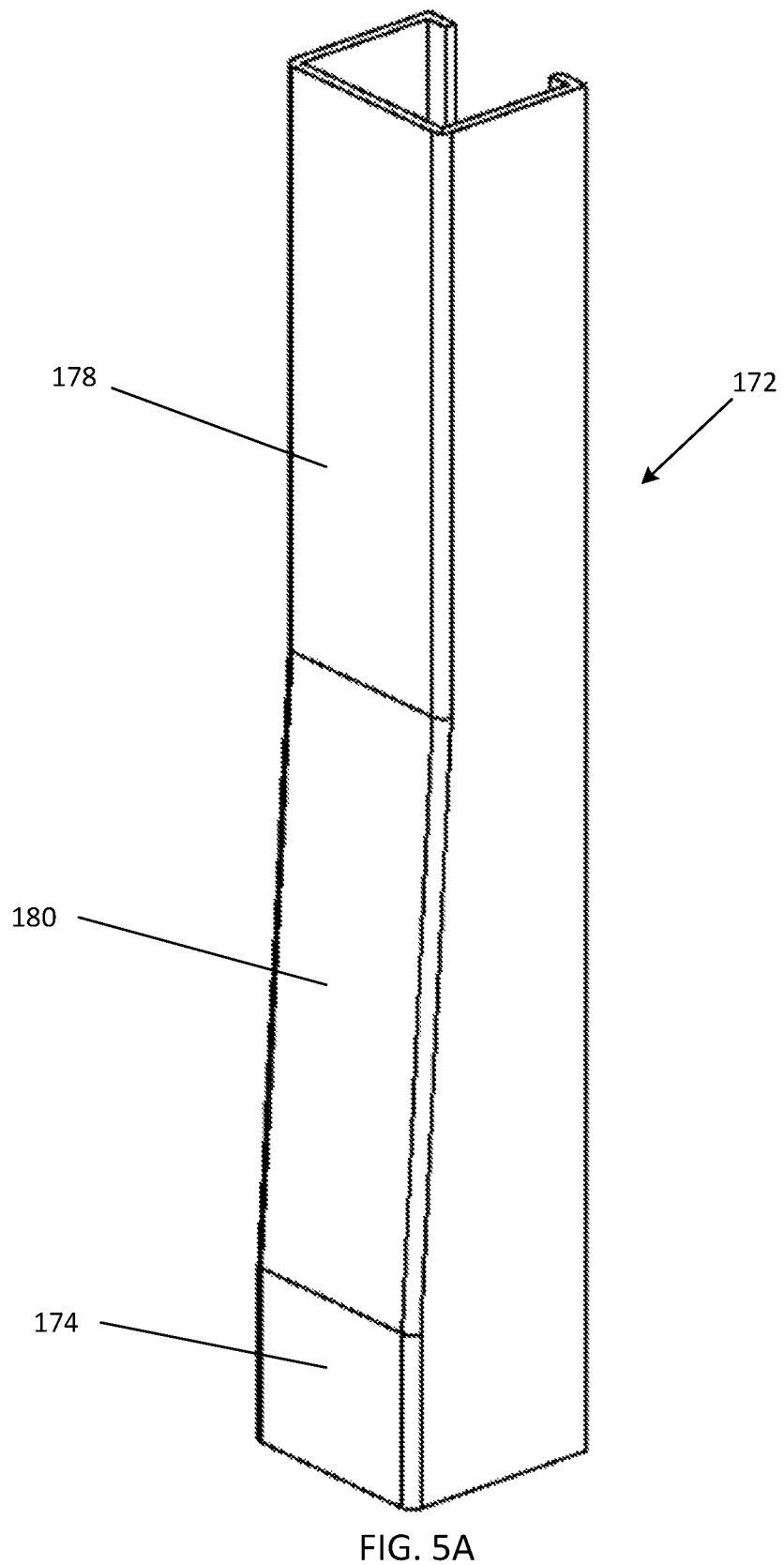
FIG. 5A is a top front isometric view of an example engagement control ramp in the form of an example filler bar cap as shown in FIG. 1.
Figure 5B:
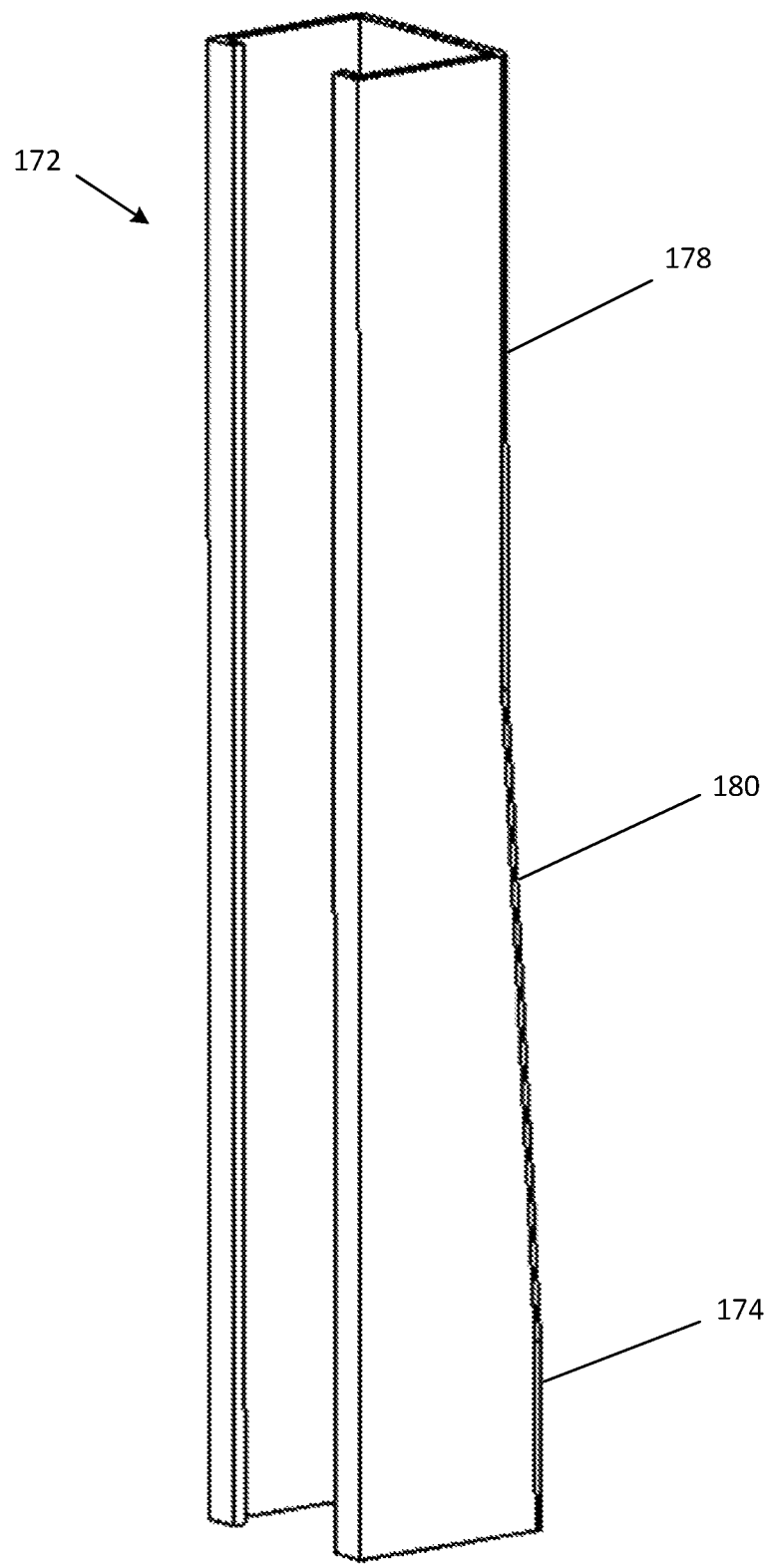
FIG. 5B is a top rear isometric view of the example filler bar cap shown in FIG. 1.
Figure 5C:
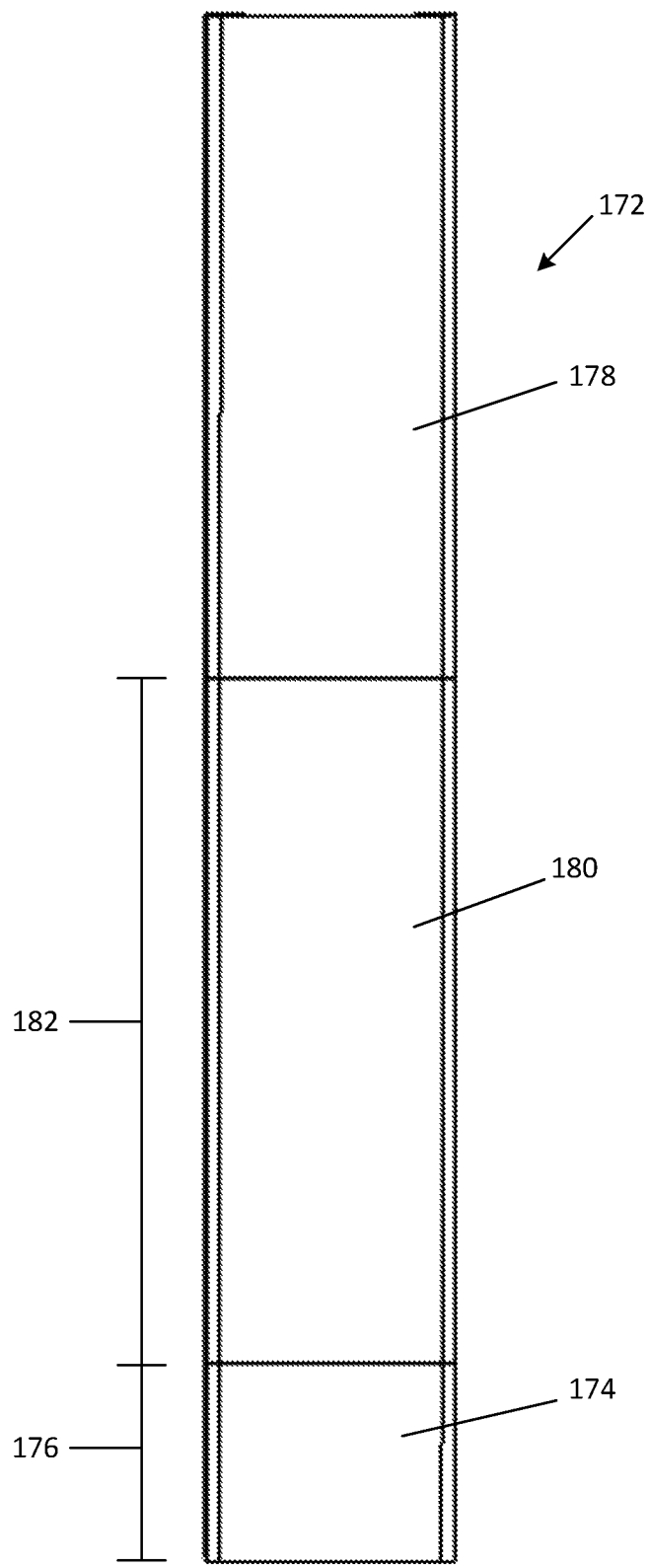
FIG. 5C is a front elevation view of the example filler bar cap shown in FIG. 1.
Figure 5D:
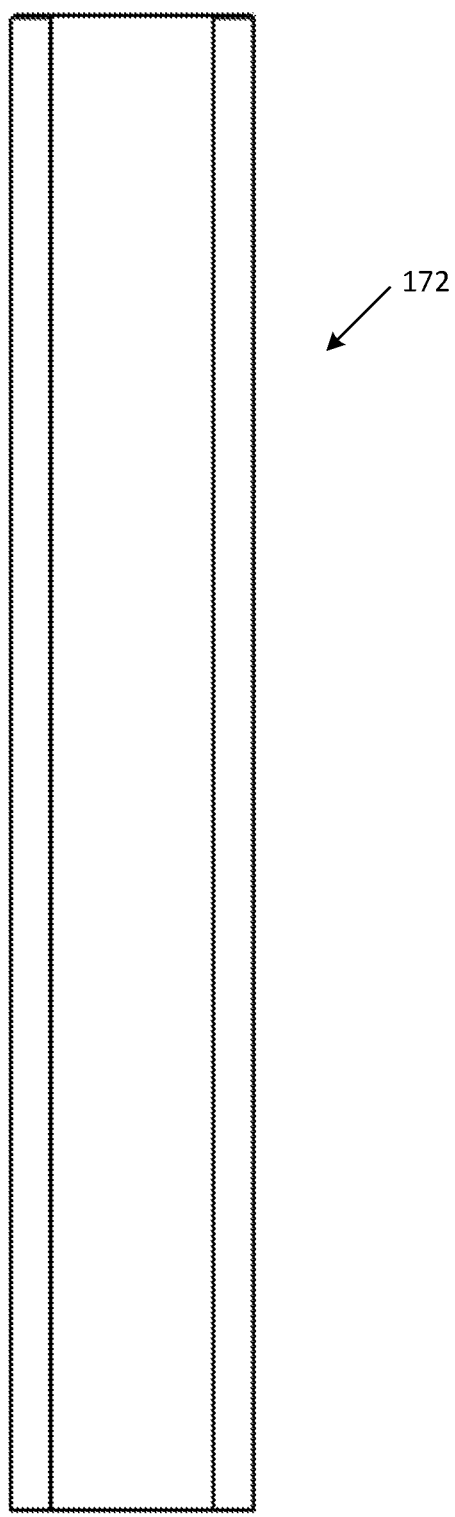
FIG. 5D is a rear elevation view of the example filler bar cap shown in FIG. 1.
Figure 5E:
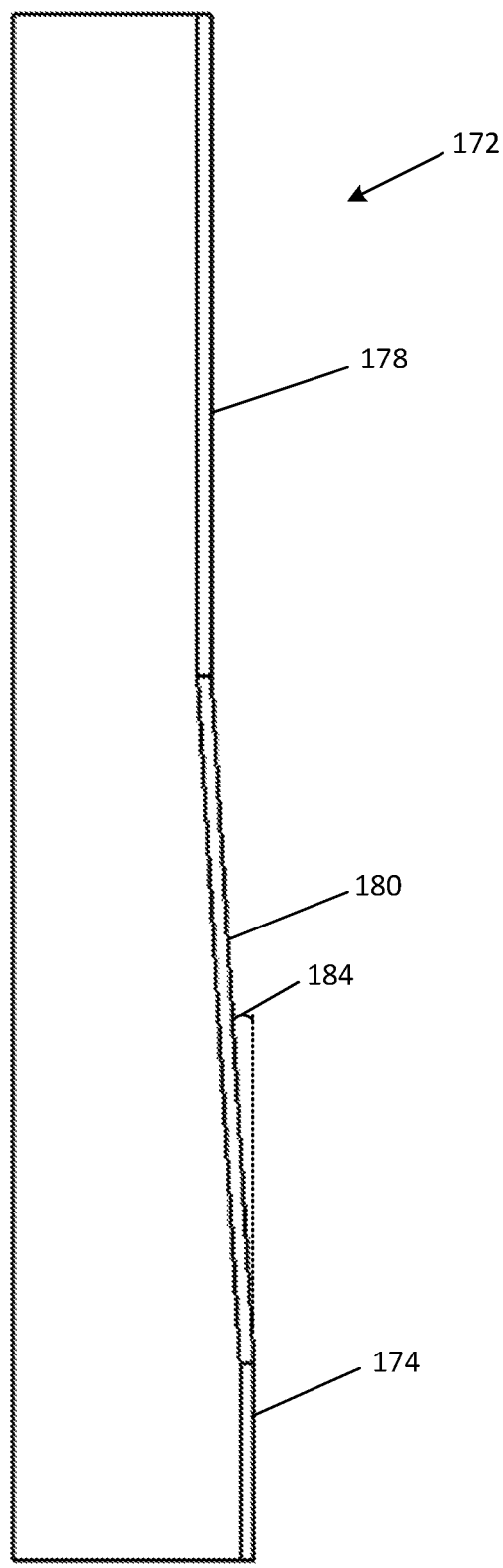
FIG. 5E is a left side elevation view of the example filler bar cap shown in FIG. 1.
Figure 5F:
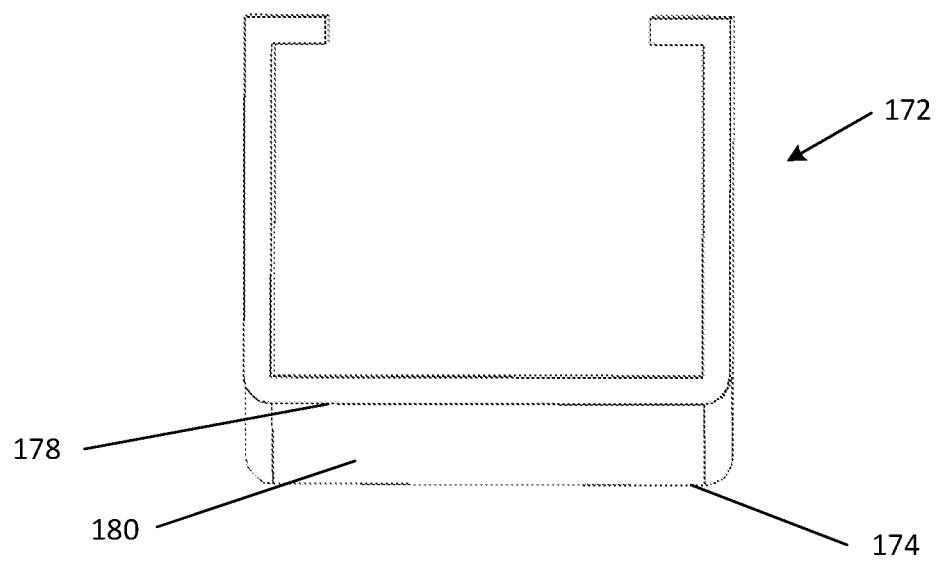
FIG. 5F is a top plan view of the example filler bar cap shown in FIG. 1.
Figure 5G:
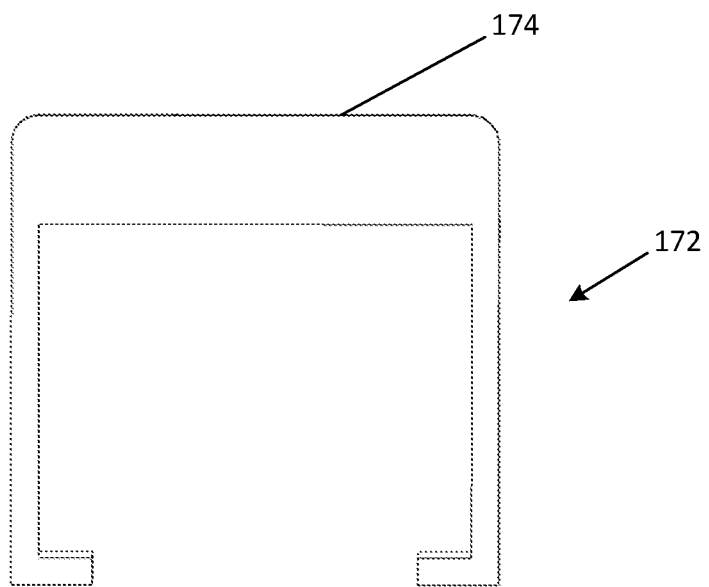
FIG. 5G is a bottom plan view of the example filler bar cap shown in FIG. 1.

The example ribs 154 on the cage bar drive cap 148 may be integrally formed with the planar portion 150 and configured to, for instance, contact and engage with frustoconical formed drive ends 114 of an exposed connector rod 112 on the inside edge of the example belt 110 (shown in FIG. 3). As the drum 120 and the vertical cage bars 140 rotate about the drum axis 130, the cage bar drive caps 148 ultimately engage and drive the belt 110 along the direct drive spiral conveyor belt system 100. Depending on, for instance, the load requirements and overall dimensions including, for example, the diameter, pitch, and elevation change from the entrance to the exit of the direct drive spiral conveyor belt system 100, the ratio and placement of cage bar drive caps 148 relative to vertical cage bars 140 with cage bar blank caps 142 (or no caps) may be adapted as desired.

With continued reference to FIG. 1, and additional reference to FIGS. 5A-5G and 8, an example embodiment of an engagement control ramp in the form of a filler bar cap 172 is shown attached to an example filler bar 170. As described below in greater detail, the filler bar cap 172 (i.e., an example engagement control ramp) is configured to define and control the relative radial and vertical dynamic positioning between the drive member (e.g., ribs 154) and the cooperating belt drive features (e.g., frustoconical drive ends 114 of the belt 110) as the belt 110 transitions during operation into positive, direct drive engagement.

Figure 8:
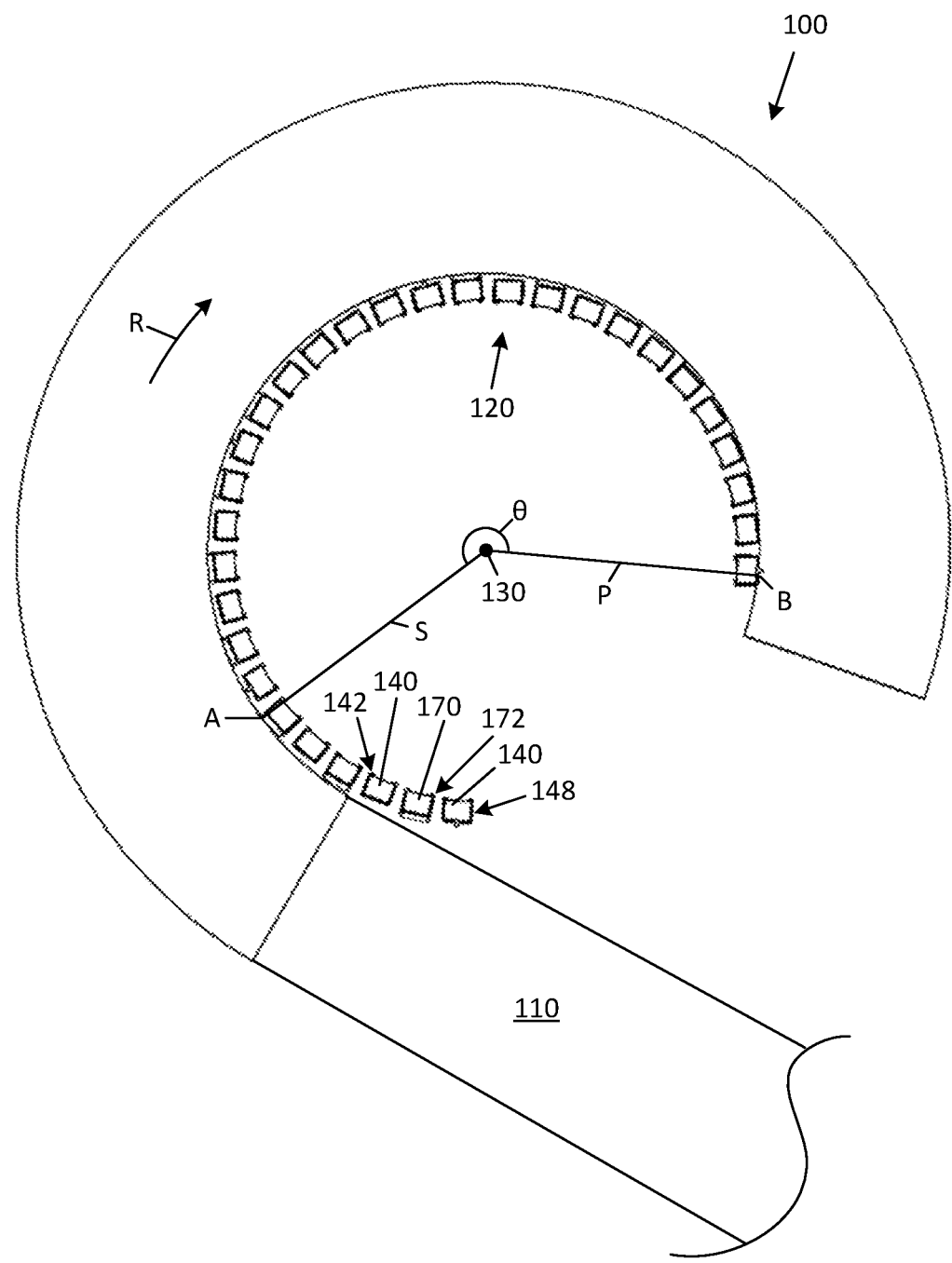
FIG. 8 is a simplified top plan view of the spiral conveyor belt system shown in FIG. 1.

In general, and with specific reference to FIG. 8, the example engagement control ramp (i.e., filler bar cap 172) establishes a secondary diameter 2S proximate an initial engagement zone A (generally at first contact between a drive end 114 of the belt 110 and an engagement control ramp arranged to rotate with the drum 120) that is relatively larger than a primary diameter 2P established in the fully engaged, direct drive engagement zone B (an example of which is further illustrated in FIG. 3 at which the drive end 114 is fully engaged (e.g., at maximum radial overlap) with the rib 154). The example engagement control ramp further includes contours to transition from the secondary diameter 2S to the primary diameter 2P as the engaged belt 110 moves vertically (up or down) along the engagement control ramp during rotation of the drum 120. In one embodiment, the example direct drive spiral conveyor belt system 100 is configured such that the initial engagement zone A is circumferentially spaced from the direct drive engagement zone B about drum axis 130 an angle θ (measured in the direction of travel R) that is less than 360°. And, in one embodiment, the vertical travel between the initial engagement zone A and the direct drive engagement zone B is less than substantially 12 inches in vertical travel (measured in a direction parallel to the drum axis 130). In other embodiments, the vertical travel (e.g., 12 inches) begins substantially at the initial engagement zone A and occurs over a range of angles θ between substantially 45° to 135°. In some embodiments, the secondary diameter 2S is substantially equal to the primary diameter 2P plus twice the radial distance of the rib 154 as measured between the planar portion 150 and the rib surface 156. In yet other embodiments, the primary diameter 2P and the secondary diameter 2S are configured such that the belt drive features (e.g., a distal tip of the drive ends 114 of the belt 110) are spaced apart from the planar portion 150 of the cage bar drive cap 148 when in the fully engaged direct drive engagement zone B to inhibit contact between the belt drive features and the planar portion 150. In still further embodiments, the secondary diameter 2S is substantially equal to the primary diameter 2P plus substantially 0.9 inches. As a result, the dynamic curvature and pitch distance between drive ends 114 of the belt 110 (i.e., example belt drive features) are effectively and efficiently accommodated over the transitional engagement with the ribs 154 (i.e., example drive members) that rotate with the drum 120. In some forms, the relative arrangement of components allows for a limited slip or relative reorientation of cooperating belt drive features and drive members. For example, the nearest belt drive feature and drive member established at substantially the initial engagement zone A may shift such that, for instance, the belt drive feature ultimately cooperates with the successive upstream or downstream drive member of the drum at the direct drive engagement zone B.

The example engagement control ramp (in the form of the filler bar cap 172) defines a body that may have a first planar portion 174, a second planar portion 178, and a ramp portion 180 extending and transitioning between the first planar portion 174 and the second planar portion 178. When a filler bar cap 172 is attached to (or integral with) one of the plurality of filler bars 170, the distance between the first planar portion 174 and the drum axis 130 defines a fourth radial distance 186 (e.g., correlating to and/or defining the secondary diameter) and the distance between the second planar portion 178 and the drum axis 130 defines a fifth radial distance 188 (e.g., correlating to the primary diameter or less). The fourth radial distance 186 may be substantially similar to the third radial distance 160, and the fifth radial distance 188 may be substantially similar to the first radial distance 146.

The filler bar cap 172 on the plurality of filler bars 170 is positioned and configured to engage and dynamically guide the drive ends 114 of the belt 110 during the transition of the belt 110 into positive engagement with the ribs 154 rotating with the drum 120. The first planar portion 174 defines an initial engagement zone A with the belt 110 where the rib 154 of the cage bar drive cap 148 initially engages with, for instance, the drive ends 114 on the exposed connector rods/pins of the belt 110. Depending on the particular pitch and drive features of the belt 110, initial engagement with the belt 110, however, primarily occurs with the first planar portion 174, and the engagement (e.g., radial overlap) between the drive ends 114 and the ribs 154 increases in the radially inward direction as the transition continues (illustrated in FIG. 3).

As the belt 110 continues to spiral with the drum 120, the belt 110 continues to travel vertically relative to the filler bar caps 172, moving first along the first planar portion 174, then to the ramp portion 180. As the ramp portion 180 slopes away from the belt 110 toward the drum axis 130, the filler bar cap 172 will gradually disengage with the belt 110 (e.g., the frustoconical formed drive ends 114) and the engagement between the belt 110 and rib 154 of the cage bar drive cap 148 will gradually increase until the belt 110 is solely engaged by the ribs 154 in a positive drive arrangement. The first planar portion 174 and the ramp portion 180 may accommodate relative movement and vertical/radial slip between the rotating drum 120 and the belt 110 as the pitch of the drive ends 114 of the belt 110 is altered during the initial engagement. The configuration of the example drive ends 114 and the ribs 154 allow for limited relative movement as the positive engagement is being established. The drive end 114 initially cams along the first planar portion 174. As the drum 120 continues to rotate, the drive end 114 is directed and urged generally vertically and radially inward, such as via a supporting guide track and related hold-down features. The ramp portion 180 may be configured to establish a vertical length that corresponds with an angle θ of substantially 90°, such that the belt 110 wraps substantially 90° about the drum 120 while the drive end 114 is moving along the ramp portion 180. The ramp portion 180 and configuration of the supporting guide track (e.g., the helix defined by the supporting guide track) are generally correlated to establish the application specific engagement desired in terms of vertical and angular dynamics of the cooperation between, for instance, the ramp portion 180, the drive ends 114, and the ribs 154. As the drive end 114 cams or rides along the ramp portion 180, the drive end 114 may also slide along the width of the ramp portion 180 (generally in the circumferential direction) unless or until the radial separation/spacing of the drive end 114 is reduced to result in radial overlap and engagement with a correlating rib 154. Thus, the transition from the filler bar cap 172 to the rib 154 of the cage bar drive cap 148 may reduce overall belt tension because the filler bar cap 172 slopes away (radially inward) relative to the belt 110 as the inner edge of the belt 110 (e.g., corresponding drive features, such as drive ends 114) contracts during the transition from a linear to a curved path, and from the secondary diameter 2S to the relatively smaller primary dimeter 2P. Generally, any relative slip in the circumferential direction may be minor and reduced further (or practically eliminated) once positive engagement is established.

The second planar portion 178 may be configured to extend vertically (e.g., upward) a desired distance to provide additional support area for the belt 100, such as for drive ends 114 that, due to the relationship between the pitch of the drive ends 114 and the ribs 154, are not in direct engagement with a rib 154. It should be understood that the direct drive spiral conveyor belt system 100 as described herein can be employed in systems moving in any vertical direction (e.g., upwards, such as in an up-go conveyor, or downwards, such as in a down-go conveyor). If the system is moving in a generally downward direction, the orientation of the elements shown in the figures are rotated approximately 180 degrees about the horizon (relative to the orientation of FIG. 1) to address the initial belt 110 engagement.

The form factors, profiles, contours, and dimensions of the first planar portion 174, the ramp portion 180, and the second planar portion 178 (e.g., the first planar portion length 176, the ramp portion length 182, and ramp angle 184) can be configured based on various characteristics of the direct drive spiral conveyor belt system 100 (e.g., the spacing of the vertical supports, the desired angle at the entrance point, such as tangential, the construction of the support track, the form factors of the cooperating belt drive features and drive members, and the location at which the belt 110 should be fully in positive engagement with the drum 120 so as to rotate generally in unison). In addition, the ramp portion 180 may be configured to define a non-linear surface slope (e.g., stepped, exponential, etc.), such that the ramp portion 180 may define a non-linearly reducing distance from the drum axis 130 in a vertical direction (e.g., a direction that is generally parallel to the drum axis 130). In one example, the ramp angle 184 is less than substantially 25°, preferably less than substantially 15°, and substantially 5° or less. In other forms, the ramp portion 180 may establish an axial to radial ratio of substantially 1:1 and preferably less than substantially 2:1. The application specific configuration can be correlated and adjusted to the underlying geometry of the established spiral path. Furthermore, while the engagement control ramp is illustrated in one example embodiment as a separate cap that can be releasably affixed to a portion of a drum (such as a stand-alone filler bar), the engagement control ramp may comprise a variety of form factors, such as a single component that is directly integrated with the drum 120 (e.g., integrally molded/formed and without the radially inward axial arms that surround an underlying support structure, such as the filler bar), that are consistent with the principles discussed herein to influence at least the radial position of the belt as it traverses vertically. The engagement control ramp may be comprised of a variety of materials (e.g., plastics, metals, and composites) that may address specifications of particular embodiments into which the engagement control ramps are incorporated.

Figure 6:
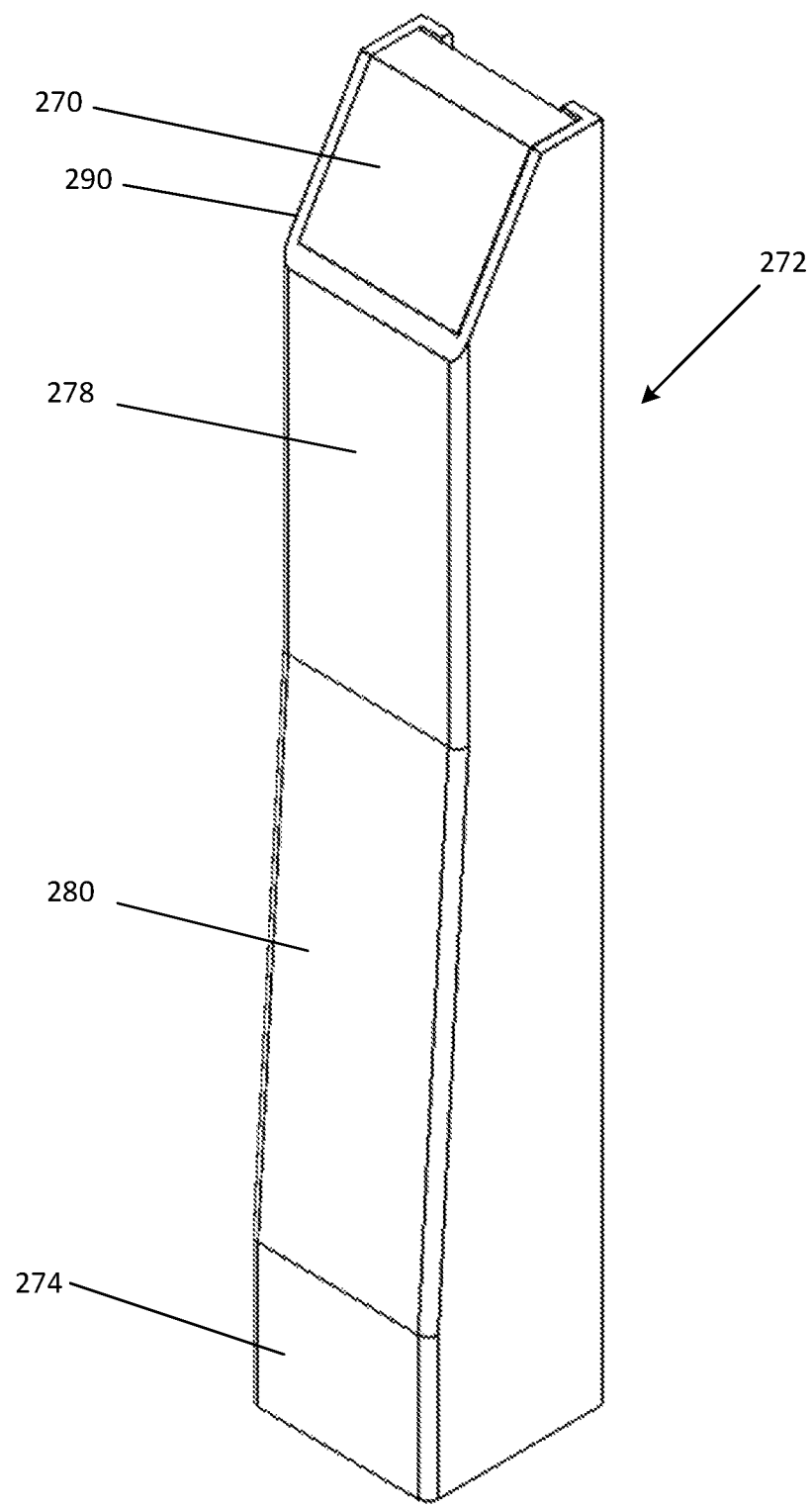
FIG. 6 is a top isometric view of another example filler bar with another example engagement control ramp in the form of a filler bar cap in accordance with one embodiment.

With reference to FIG. 6, another example embodiment of the engagement control ramp in the form of a filler bar cap 272 is shown installed on a filler bar 270. In many aspects the filler bar cap 272 is similar to the filler bar cap 172 described above and similar numbering is used for the filler bar cap 272. For example, the filler bar cap 272 has a first planar portion 274, a second planar portion 278, and a ramp portion 280 extending between the first planar portion 274 and the second planar portion 278. The filler bar cap 272 is also configured to engage with the filler bar 270, such as being slid over or resiliently flexed onto the filler bar 270 and secured (e.g., via fasteners, adhesive, etc.). In some aspects, however, the filler bar caps 172, 272 differ from each other. For example, the filler bar cap 272 further includes a beveled portion 290 adjacent the second planar portion 278. The beveled portion 290 further slopes away (radially inward toward the drum axis 130) from a belt to further distance the filler bar cap 272 and supporting filler bar 270 from the belt as the belt traverses vertically relative to the filler bar cap 272. As shown, the beveled portion 290 follows the profile of the similarly shaped filler bar 270. Again, while the example embodiment depicts a two-piece filler bar 270 and filler bar cap 272, the two components can be, for instance, integrally formed.

Figure 7:
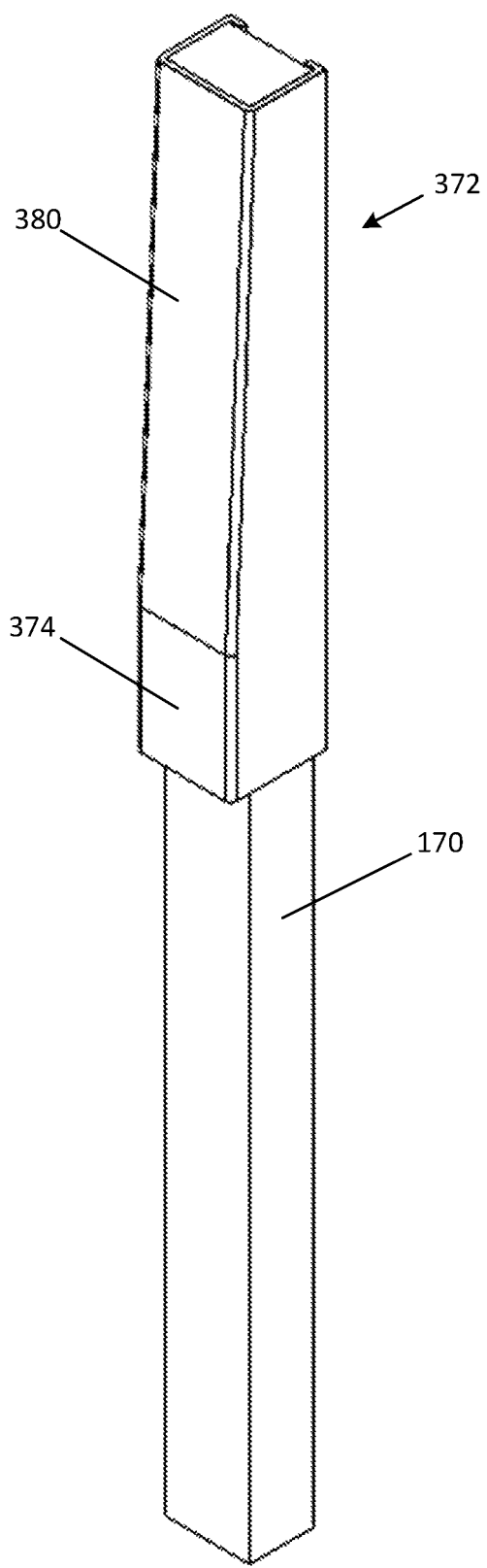
FIG. 7 is a top isometric view of a further example filler bar with a further example engagement control ramp in the form of a filler bar cap in accordance with one embodiment.

With reference to FIG. 7, yet another example embodiment of the engagement control ramp in the form of a filler cap bar 372 according to the invention is shown installed on a filler bar 170. In many aspects the filler bar cap 372 is similar to the filler bar cap 172 described above and similar numbering is used for the filler bar cap 372. For example, the filler bar cap 372 has a first planar portion 374 and a ramp portion 380. The filler bar cap 372 is also configured to engage with a filler bar 170. However, in some aspects the filler bar cap 372 differs from the filler bar cap 172. For example, there is no second planar portion as the ramp portion 380 extends from the first planar portion 374 to the end of the filler bar cap 372. Furthermore, as illustrated in FIG. 7, the placement of the filler bar cap 372 along the filler bar 170 need not be at an end of the filler bar 170, but can be, for instance, at any location along the filler bar 170 providing the desired relative placement to effect the belt transition for a particular application.

In one example use, the direct drive spiral conveyor belt system can incorporate a rotating drum with a plurality of filler bars interspaced with a plurality of vertical cage bars, all of which can be radially spaced from a drum axis. The plurality of filler bars can have a planar portion and a ramp portion, whereby the planar portion provides an engagement surface at a distance farther away from the drum axis than the cage bar and associated drive member, and the ramp portion slopes inward from the planar portion towards the drum axis. The initial contact between the filler bar and the belt can be made with the planar portion, and as the belt moves vertically along the spiral conveyor belt system, the belt transitions from the planar portion to the ramp portion. As the belt transitions from the planar portion to the ramp portion, a drive member of the drum engages the belt to establish a positive drive relationship. As the belt travels vertically along the spiral conveyor belt system, the belt also may move radially inward along the ramp portion that slopes away toward a drum axis until the belt is fully engaged and driven through the drive member.

It will be appreciated by those skilled in the art that while the invention has been described above in connection with particular embodiments and examples, the invention is not necessarily so limited, and that numerous other embodiments, examples, uses, modifications, and departures from the embodiments, examples, and uses are intended to be encompassed by the claims attached hereto. For example, the spacing, size, gauge, form-factor, and other features may vary based on application-specific requirements (e.g., product to be conveyed, environmental factors, speed of conveyance, operational envelope limitations, etc.). In addition, while the embodiments have been described in context of a metallic construction, it is contemplated that other materials (e.g., polymers) or composite constructions (e.g., a metallic base with a plastic overmold) are possible. In addition, a direct drive spiral conveyor belt system may incorporate the attachment of caps to filler bars that have a profile for first engaging and then disengaging with a belt as the belt moves along the spiral conveyor belt system to provide a transition from a linear conveyance to a spiral conveyance. Other types of conveyor belt systems may also benefit from the incorporation of aspects of the invention.

Various features and advantages of the invention are set forth in the following claims.

The invention claimed is:

1. A direct drive spiral conveyor belt system comprising:
a drum configured to rotate about a drum axis and define a filler bar and a cage bar, the cage bar defining a drive member having a drive member length parallel to the drum axis;
a belt configured to engage the drum and define a belt drive feature adapted to operatively engage the drive member; and
an engagement control ramp having an engagement control ramp length parallel to the drum axis that is less than the drive member length, and configured to rotate with the filler bar and operatively engage the belt, the engagement control ramp comprising:
a first portion defining a first radial distance from the drum axis; and
a second portion defining a second radial distance profile that decreases radially from the first radial distance;
wherein the engagement control ramp is configured to define a dynamic axial and radial engagement between the drive member and the belt drive feature as the belt drive feature transitions into engagement with the drive member while the drum rotates about the drum axis and the belt moves relative to the engagement control ramp.

2. The direct drive spiral conveyor belt system of claim 1, wherein:
the first portion is a planar portion; and
the second portion is a ramp portion.

3. The direct drive spiral conveyor belt system of claim 2, wherein:
the planar portion is parallel relative to the drum axis; and
the ramp portion is skewed relative to the drum axis.

4. The direct drive spiral conveyor belt system of claim 2, wherein the ramp portion defines a ramp angle of less than 25 degrees relative to the drum axis.

5. The direct drive spiral conveyor belt system of claim 1, wherein the second radial distance profile decreases in distance from the drum axis along an axial direction parallel to the drum axis.

6. The direct drive spiral conveyor belt system of claim 1, wherein the second radial distance profile decreases in a non-linear form.

7. The direct drive spiral conveyor belt system of claim 1, wherein the second radial distance profile decreases in an axial to radial ratio of less than 1:1.

8. The direct drive spiral conveyor belt system of claim 1, wherein:
the engagement control ramp comprises a filler bar cap configured to engage the filler bar of the drum; and
wherein the engagement control ramp length is less than half of the drive member length.

9. The direct drive spiral conveyor belt system of claim 1, further comprising:
a belt drive radial distance defined from the drum axis to a radial end of the belt drive feature; and
wherein the belt drive radial distance is equal to the first radial distance.

10. The direct drive spiral conveyor belt system of claim 1, wherein:
the engagement control ramp further comprising a third portion adjacent to the second portion and defining a third radial distance from the drum axis;
the drive member comprising a rib that extends radially outward from the drum a rib distance;
the first radial distance is equal to the sum of the rib distance and the third radial distance.

11. The direct drive spiral conveyor belt system of claim 1, wherein:
the belt further comprises another belt drive feature adapted to operatively engage the engagement control ramp while the drum rotates about the drum axis; and
the another drive feature defines a frustoconical drive end of a connector rod of the belt.

12. A method of operating a direct drive spiral conveyor system having a conveyor belt with a plurality of belt drive features, and a drum rotatable about a drum axis and comprising a cage bar having a drive member that extends a drive member length and a filler bar, separate from the cage bar, having an engagement control ramp that extends an engagement control ramp length that is less than the drive member length and defines a ramp portion that transitions between a secondary diameter and a primary diameter that is less than the secondary diameter, the method comprising:
engaging a first belt drive feature of the plurality of belt drive features of the conveyor belt with the engagement control ramp of the filler bar proximate the secondary diameter; and
engaging a second belt drive feature of the plurality of belt drive features of the conveyor belt with the drive member of the cage bar as the first belt drive feature is dynamically engaged with the engagement control ramp within the ramp portion that transitions between the secondary diameter and the primary diameter.

13. The method of operating a direct drive spiral conveyor system of claim 12, further comprising disengaging the first belt drive feature from the engagement control ramp proximate the primary diameter.

14. The method of operating a direct drive spiral conveyor system of claim 13, wherein the disengaging occurs within 360 degrees about the drum axis from either the engaging the first belt drive feature with the engagement control ramp and the engaging the second belt drive feature with the drive member.

15. The method of operating a direct drive spiral conveyor system of claim 13, wherein the disengaging occurs between 45 degrees to 135 degrees about the drum axis from the either engaging the first belt drive feature with the engagement control ramp and the engaging the second belt drive feature with the drive member.

16. The method of operating a direct drive spiral conveyor system of claim 13, wherein the disengaging occurs when the second belt drive feature is fully engaged with the drive member.

17. The method of operating a direct drive spiral conveyor system of claim 12, wherein the engaging the second belt drive feature with the drive member as the first belt drive feature is dynamically engaged with the engagement control ramp defines relative radial and vertical dynamic positioning between the drive member and the second belt drive feature as the first belt drive feature engages the ramp portion that transitions between the secondary diameter and the primary diameter.

18. An engagement control ramp configured for use with a drum of a direct drive spiral conveyor system, the drum comprising at least one filler bar and at least one cage bar that is separate from the filler bar and that defines a drive member having a drive member length, the engagement control ramp comprising:
a body extending along a length from a first end to a second end, wherein the body is configured to move with the filler bar of the drum and the length is less than the drive member length;
a planar portion located near the first end; and
a ramp portion adjacent to the planar portion, the ramp portion being increasingly spaced from the planar portion in two orthogonal directions to define a radial distance profile along a portion of the length.

19. The engagement control ramp of claim 18, wherein the body further comprising at least one of a second planar portion adjacent to the ramp portion and a beveled portion adjacent to at least one of the second planar portion and the ramp portion.

20. The engagement control ramp of claim 18, wherein the body is configured to selectively couple to the filler bar of the drum.

21. A method of operating a direct drive spiral conveyor system having a conveyor belt with a plurality of belt drive features, and a drum rotatable about a drum axis and comprising a cage bar having a drive member that extends a drive member length and a filler bar, separate from the cage bar, having an engagement control ramp that extends an engagement control ramp length that is less than the drive member length and defines a ramp portion that transitions between a secondary diameter and a primary diameter that is less than the secondary diameter, the method comprising:
engaging a first belt drive feature of the plurality of belt drive features of the conveyor belt with the engagement control ramp of the filler bar proximate the secondary diameter;
engaging a second belt drive feature of the plurality of belt drive features of the conveyor belt with the drive member of the cage bar as the first belt drive feature is dynamically engaged with the engagement control ramp within the ramp portion that transitions between the secondary diameter and the primary diameter; and
disengaging the first belt drive feature from the engagement control ramp proximate the primary diameter.

* * * * *